(12) United States Patent
Larocque et al.

(10) Patent No.: US 10,120,072 B2
(45) Date of Patent: Nov. 6, 2018

(54) METHOD FOR DETERMINING A DISTANCE BETWEEN AN FMCW RANGING DEVICE AND A TARGET

(71) Applicant: Siemens Aktiengesellschaft, Munich (DE)

(72) Inventors: Jean-René Larocque, Peterborough (CA); Jing Liu, Peterborough (CA)

(73) Assignee: Siemens Aktiengesellschaft, Munich (DE)

( * ) Notice: Subject to any disclaimer, the term of this patent is extended or adjusted under 35 U.S.C. 154(b) by 376 days.

(21) Appl. No.: 14/943,935

(22) Filed: Nov. 17, 2015

(65) Prior Publication Data

US 2016/0139264 A1   May 19, 2016

(30) Foreign Application Priority Data

Nov. 18, 2014   (EP) .................................. 14193615

(51) Int. Cl.
*G01S 15/06* (2006.01)
*G01S 7/02* (2006.01)
(Continued)

(52) U.S. Cl.
CPC ............ *G01S 15/06* (2013.01); *G01F 23/284* (2013.01); *G01S 7/023* (2013.01); *G01S 7/354* (2013.01);
(Continued)

(58) Field of Classification Search
CPC .......... G01S 15/06; G01S 7/023; G01S 7/354; G01S 13/343; G01S 13/88; G01F 23/284; G01F 23/2962
(Continued)

(56) References Cited

U.S. PATENT DOCUMENTS 6,529,568 B1 * 3/2003 Richards ................ H04B 1/719
370/286
6,810,342 B1   10/2004 Gulden et al.
(Continued)

FOREIGN PATENT DOCUMENTS

DE           4327333 A1    2/1995
GB           2350004 A    11/2000
WO   WO 2009/134202 A1   11/2009

*Primary Examiner* — Isam A Alsomiri
*Assistant Examiner* — Amie M Ndure
(74) *Attorney, Agent, or Firm* — Cozen O'Connor

(57) ABSTRACT

A method for determining a distance between a ranging device and target, wherein a valid interference profile, if already available, is subtracted from a frequency-domain echo profile that is analyzed to determine the distance of the target, where to obtain or update the valid interference profile, a low-frequency portion of the frequency-domain echo profile is stored as a temporary interference profile after each measurement, and if the target is not proximal to the ranging device and the valid interference profile is not available, the temporary interference profile is saved as the valid interference profile, otherwise if the valid interference profile is available, the valid interference profile is updated via the temporary interference profile, otherwise if the target is distal and the valid interference profile is not yet available, the temporary interference profile is first subjected to a quality check before being saved as the valid interference profile.

8 Claims, 3 Drawing Sheets

(51) Int. Cl.
- *G01S 7/35* (2006.01)
- *G01F 23/284* (2006.01)
- *G01S 13/34* (2006.01)
- *G01S 13/88* (2006.01)
- G01F 23/296 (2006.01)

(52) U.S. Cl.
CPC ............ *G01S 13/343* (2013.01); *G01S 13/88* (2013.01); *G01F 23/2962* (2013.01)

(58) Field of Classification Search
USPC ........................................................ 367/101
See application file for complete search history.

(56) References Cited

U.S. PATENT DOCUMENTS

| | | |
|---|---|---|
| 9,608,727 B2 * | 3/2017 | Aoyama |
| 2002/0061080 A1 * | 5/2002 | Richards ................ H04B 1/719 375/346 |
| 2002/0061081 A1 * | 5/2002 | Richards .................. H04B 1/69 375/346 |
| 2006/0049981 A1 * | 3/2006 | Merkel ................... G01S 7/288 342/195 |
| 2007/0086624 A1 * | 4/2007 | Breed ................ G06K 9/00362 382/104 |
| 2009/0273506 A1 | 11/2009 | Delin |
| 2011/0181458 A1 | 7/2011 | Fell |
| 2014/0286644 A1 * | 9/2014 | Oshima .................. H04B 10/11 398/118 |

\* cited by examiner

METHOD FOR DETERMINING A DISTANCE BETWEEN AN FMCW RANGING DEVICE AND A TARGET

BACKGROUND OF THE INVENTION

1. Field of the Invention

The invention relates to a method for determining a distance between a frequency modulated continuous wave (FMCW) ranging device and a target.

2. Description of the Related Art

Conventional FMCW ranging devices may be sound or microwave-based and are used for performing distance or level measurements in industrial process control, factory automation or automotive applications.

Here, a transmitted signal is modulated to periodically sweep over a predetermined frequency range. A received signal, which comprises echo signal portions from the object of interest and other obstacles, is mixed down with the transmitted signal and the frequency difference signal obtained is analyzed by, e.g., a Fast Fourier Transform (FFT) to obtain a frequency spectrum in which the echoes appear as peaks. The echoes or peaks in the frequency spectrum (also referred to as echo profile) may be separate or may overlap. The most commonly applied technique to identify an echo of interest relies on the power spectrum density (PSD), usually calculated by FFT, to estimate the frequency of interest as the frequency corresponding to the largest component of the FFT-PSD.

The received signal, and thus the frequency-domain echo profile, often contains not only the desired useful frequency caused by reflection on the target, but also undesirable interference components at different frequencies, which may be caused by internal reflections in the electronics and on the antenna, or by external reflections, such as on the bottoms of containers, and on container struts. These interference components create a critical difficulty in determining the frequency of interest in their immediate vicinity. It is therefore necessary to attempt to suppress these interference components effectively.

DE 43 27 333 A1 describes a method for eliminating interference components in the frequency spectrum of an FMCW radar level device. The interference components are assumed to be at constant frequencies and independent on the level to be measured. A reference measurement is initially made in an empty container to record these interference components. In subsequent normal measurements, when the container contains a liquid, the recorded interference components are corrected with the aid of the measured intensity of a first interference component and subtracted from the respective frequency spectra obtained.

U.S. Pat. No. 6,810,342 B1 discloses a similar method where also a reference measurement is also made initially in absence of a target to record a spectrum of interference frequencies. In subsequent normal measurements, the downmixed frequency difference signal is sampled at a predetermined number of sampling points that are equidistant in time. The interference frequencies of the recorded spectrum are used to determine, from the sampled frequency difference signal, complex amplitudes that approximate the proportion of the frequency spectrum of the sampled signals caused by the interference frequencies. The frequency spectrum caused by interference frequencies is then subtracted from the sampled frequency difference signal.

The conventional methods are based on the assumption that the interference frequencies have virtually constant, a priori known frequencies and do not vary with time which in practice is often not the case. In fact, the interference frequencies may vary with environmental factors, such as temperature, humidity and over time, because of aging of the ranging device, so that there is no adequate knowledge of the interference signals. Furthermore, the conventional methods require a special set-up for a reference measurement shot in the air or into an empty vessel.

In particular, when a target gets close or proximate to the ranging device or its antenna, the received signal is severely distorted in a much degraded error performance compared to that of further range targets. One reason for the degradation of performance is the existence of a huge interference factor in close in range, generally known as ring-down. The interferences emanate from complicated sources, which include, strong reflections from within the measuring system (RF output, waveguides, pressure separation, antenna), and dispersion within the system's transmission paths.

These interferences are known in their existence, but unknown in their properties. When a target gets close, the received signal contains a desired useful frequency that is close to interference frequencies. These signals are mixed and make it hard for any evaluation algorithm to determine the distance of the target with high accuracy. Therefore, the close-in range very often forms a blanking zone and the specified measuring range starts from a distance of, e.g., 1 m from the antenna of the ranging device, or the measurement tolerance within that region is increased.

SUMMARY OF THE INVENTION

It is therefore an object of the invention to provide a method for effectively removing close range interferences from the frequency spectrum of a frequency modulated continuous wave (FMCW) ranging device.

This and other objects and advantages are achieved in accordance with the invention by providing a method for determining a distance between an FMCW ranging device and a target, comprising transmitting a transmit signal towards the target, receiving a receive signal caused by reflections of the transmit signal, determining a frequency difference signal of the transmit signal and the receive signal, calculating a frequency-domain echo profile from the frequency difference signal, storing a low-frequency portion of the echo profile as a temporary interference profile, subtracting, if already available, a valid interference profile from the echo profile, analyzing the echo profile or interference-free echo profile in order to determine the distance of the target, and, if the target is in a close range to the ranging device and if the valid interference profile is available, returning to the first step, or else.

Otherwise, if the valid interference profile is not yet available, subtracting the temporary interference profile from the echo profile, analyzing the echo profile free from the temporary interference profile for another determination of the distance of the target, saving the temporary interference profile as the valid interference profile if the difference of the results of the two determinations of the distance is within a specified tolerance, and returning to the first step.

Otherwise, if the target is not in a close range to the ranging device, and if the valid interference profile is available, updating the valid interference profile by using the temporary interference profile, and returning to the first step. Otherwise, if the valid interference profile is not yet available, saving the temporary interference profile as the valid interference profile, and returning to the first step.

The method in accordance with the invention is based on the understanding that the close-in interferences or ring-down, though not at constant frequencies, are rather stationary or slowly changing and can be tracked in time. If this ring-down pattern is learned, it can be removed from the true signal, leaving a clean signal and increased performance close-in.

The interferences are extracted from an echo profile that is obtained from regular measurement shots and calculated from the frequency difference signal of the transmit signal and the receive signal. The interferences are only concentrated on close in range which, for an FMCW ranging device, corresponds to a low frequency range. The echo profile is therefore calculated in the frequency-domain, preferably via an FFT, which results in an array of complex values corresponding to frequencies. Thus, the same FFT algorithm is used to obtain an interference profile and to process the regular echo profile. As only the low-frequency front section of the frequency domain contains the interferences, it costs a negligible small amount of memory to store the interference profile. For example, if the ranging device considered uses 4K FFT sampling points for the echo profile, only 20 points might be necessary to save the interference.

Once a valid interference profile is determined, it will be removed from the echo profiles obtained from regular measurement shots, which echo profiles free from the interferences will then be analyzed to determinate the distance of the target. There are different techniques to analyze an echo profile to identify an echo of interest. As the echo profile is preferably calculated via an FFT, a power spectrum density (PSD) of the echo profile may be calculated to estimate a frequency of interest as the frequency corresponding to the largest component of the power spectrum density and to calculate the distance of the target from that frequency of interest.

In order to determine a valid interference profile, each interference profile obtained from a regular measurement shot is temporarily stored, and the echo profile is analyzed to determine the distance of the target. If the distance determined is far away from the ranging device, the temporarily stored interference profile is either saved as the valid interference profile or an already established valid interference profile will be updated. The valid interference profile can be updated directly to the latest temporarily stored interference profile or it can be updated by filtering with the temporary interference profile, e.g., by computing a weighted average of the valid interference profile and the temporary interference profile. If the measurement environment and thus the interferences are expected to change very rapidly, the first implementation is preferable. If the environment is slow moving, then the second implementation would provide a more stable valid interference profile and provide the benefits of time averaging.

At the beginning of a measurement, when the target is in a close range to the ranging device and a valid interference profile is not yet present, the temporary interference profile may be saved as the valid interference profile if its quality is acceptable. This is the case when the target distance calculated from the echo profile after subtraction of the temporary interference profile is the same, within a specified tolerance, as the distance calculated from the original echo profile.

The method in accordance with the invention may be used for different radar or ultrasound-based distance measurement applications, but is preferably used for radar-based level measurements, where the target is a surface of a material in a container or on a carrier such as a bulk material conveyor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Reference will now be made to the accompanying drawings, which show, by way of example, a preferred embodiment of the present invention, and in which.

DETAILED DESCRIPTION OF THE EXEMPLARY EMBODIMENTS

Figure 1:
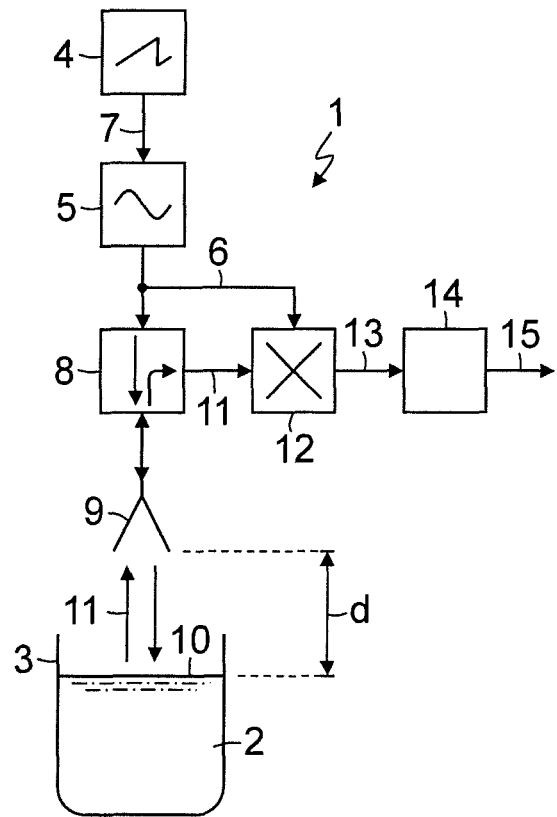
FIG. 1 is a schematic diagram of an FMCW ranging device in accordance with the invention.

FIG. 1 shows a functional block diagram of a radar-based FMCW ranging device 1 for measuring a target filling level of a material 2 in a container 3. The device 1 comprises a function generator 4 that drives a voltage-controlled microwave oscillator 5. The oscillator 5 generates a microwave signal 6, which is frequency-modulated as a function of a linear, e.g., triangular or sawtooth-shaped, modulation function 7 that is periodically generated by the function generator 4. The microwave signal 6 is supplied via a circulator or directional coupler 8 to an antenna 9 from which it is transmitted as a transmit signal to a target surface 10 of the material 2 in the container 3. The transmitted signal 6 is reflected back by the surface 10 and is received by the antenna 9 as reflected signal 11 after a propagation time proportional to a distance d between the device 1 or its antenna 9 and the surface 10. The received signal 11 is directed by the circulator or directional coupler 8 to a mixer 12, in which it is mixed with the microwave signal 6 for demodulation purposes. The down-mixed signal 13 is then supplied to an evaluation unit 14, preferably after filtering is (not shown) to eliminate high-frequency interference components.

During the propagation time of the received signal 11, the frequency of the transmit signal 6 has changed due to its frequency modulation so that the transmit signal 6 and the receive signal 11 have different frequencies. Therefore, the down-mixed signal or frequency difference signal 13 has a frequency corresponding to the difference of the frequencies of the signals 6 and 11. The frequency modulation of the transmit signal 6 is linear over time. As a result, the frequency of the down-mixed signal 13 is directly proportional to the distance to be measured. In the evaluation unit 14, the down-mixed signal 13 is subjected to an FFT to obtain a frequency spectrum or echo profile that is further analyzed to determine the target distance d and provide it at an output 15.

The distance measurement, however, suffers from a kind of self-interference or "ring-down" that is superimposed onto the useful echoes from nearby targets, thus compromising the detection performance of the ranging device 1 at short ranges.

Figure 2:
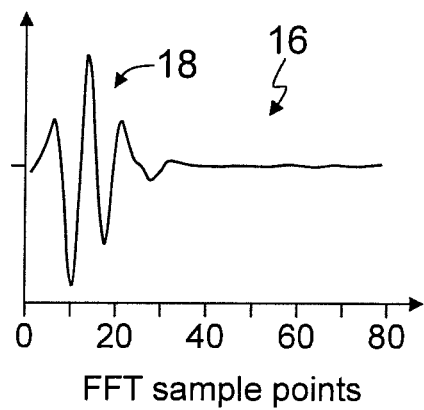
FIGS. 2 and 3 show exemplary graphical plots of exemplarily show the respective in-phase and quadrature signal components of a frequency-domain echo profile.
Figure 3:
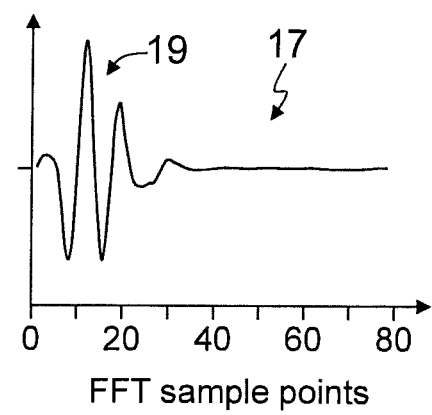

FIGS. 2 and 3 show exemplary graphical plots of the respective in-phase signal component 16 and quadrature signal component 17 of the frequency-domain echo profile for three regular measurement shots taken at 5 m, 6 m and 7 m respectively, under the same testing environment, within 20 minutes of testing time (so that environment changes can be ignored). The plotting is zoomed in to close in range, and it can be observed that the interferences 18, 19 have perfect consistency over the three measurement shots (that are far apart in time and range). The consistency validates that for a given device 1, under the same testing environment, the interferences 18, 19 remain unchanged which allows their removal from the echo profile, because they are the same when the target is close-in or further away.

Figure 4:
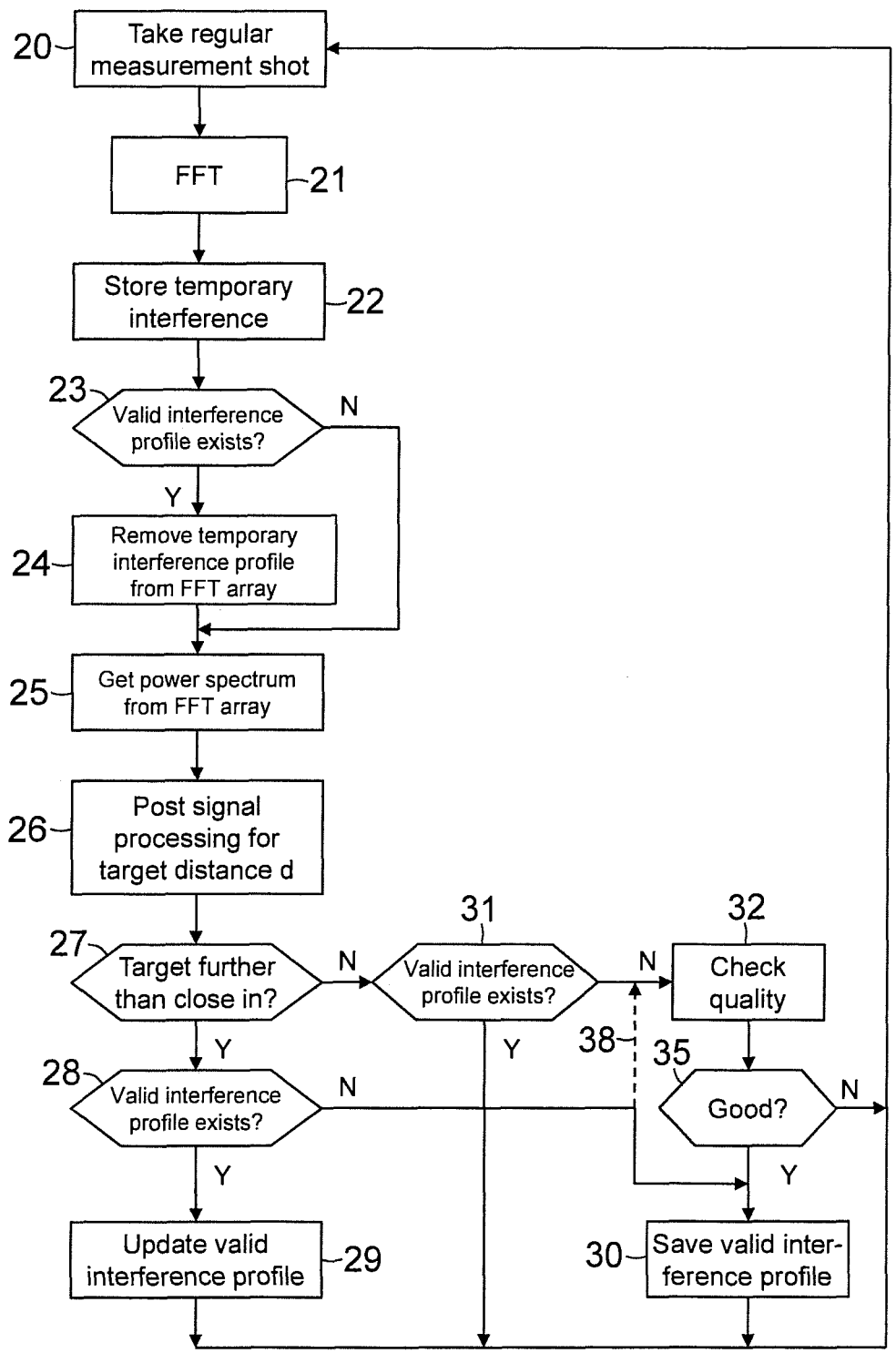
FIG. 4 is a flowchart depicting steps of an exemplary embodiment of the method of the invention.

FIG. 4 is a flowchart of a method for determining the distance d between the FMCW ranging device 1 and the target 10. The method comprises taking a regular measurement shot by transmitting the transmit signal 6 towards the target 10 and determining the frequency difference signal 13 from the transmit signal 6 and the receive signal 11, as indicated in step 20. In the example shown, each measurement shot coincides with a period of the sawtooth function 7 (FIG. 1).

Next, the frequency difference signal 13 is subjected to an FFT to obtain the frequency spectrum or echo profile (16, 17 in FIGS. 2 and 3), as indicated in step 21. The result is an array of, e.g., 4K FFT sampling points.

A low-frequency portion, e.g., 20 sampling points of the front section of the echo profile is then stored as a temporary interference profile, as indicated in step 22.

Then, in a decision step 23, it is determined whether a valid interference profile has been found already.

If a valid interference profile has been found, then the valid interference profile is subtracted from the echo profile, as indicated in step 24. If not, step 24 is skipped.

Next, the echo profile (or interference-free echo profile) is analyzed by first calculating the PSD of the echo profile, as indicated in step 25, and then estimating a frequency of interest from the PSD to calculate the distance d of the target from said frequency of interest, as indicated in step 26.

Then, in a decision step 27, it is determined whether the target 10 is far away from the ranging device 1.

If the target is far away, and if a valid interference profile is available, as determined in step 28, then the valid interference profile is updated by using the temporary interference profile, as indicated in step 29. The method then returns to the first step 20 for another regular measurement shot. Performing the update may comprise computing a weighted average of the valid interference profile and the temporary interference profile:

updated_valid_interference_profile=A*valid_interference_profile+
(1−A)*temporary_interference_profile, where 0<A<1.

If a valid interference profile is not yet available, the temporary interference profile is saved as the valid interference profile, as indicated in step 30. As indicated by a dashed line 38, a quality check (step 32) may be included as explained in detail below. However, as the target 10 is far away, it is highly likely that the target echo and the interferences are clearly separated in the echo profile so that the quality check may be optional.

If the target 10 is in close range to the ranging device 1 and if a valid interference profile is available, as determined in step 31, nothing is done and the method returns to the first step 20 for another regular measurement shot.

If the target 10 is close in range and if there is no valid interference profile, the temporary interference profile is checked to determine whether its quality is sufficient to be saved as the valid interference profile, as indicated in step 32.

Figure 5:
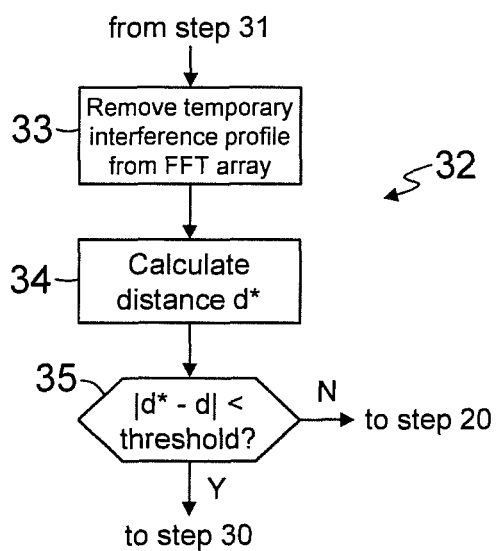
FIG. 5 is a flowchart of a subroutine of the flowchart of FIG. 4.

FIG. 5 is a subroutine for performing the quality check at step 32. First, the temporary interference profile is subtracted from the echo profile, as indicated in step 33.

Next, in a step 34, the temporary-interference-free echo profile is analyzed in the same way as described with respect to step 26 to calculate a target distance d*.

Then, in a decision step 35, the target distance d* calculated in step 34 is compared with the distance d calculated in step 26 from the original echo profile. The quality of the temporary interference profile is considered good if the difference |d*−d| of the calculated target distances is within a specified tolerance.

Returning to FIG. 4, if the quality of the temporary interference profile is accepted, as ascertained in step 35, the routine proceeds to step 30 and the temporary interference profile is saved as the valid interference profile. If the quality is not accepted, the method returns to the first step 20 for another regular measurement shot.

Figure 6:
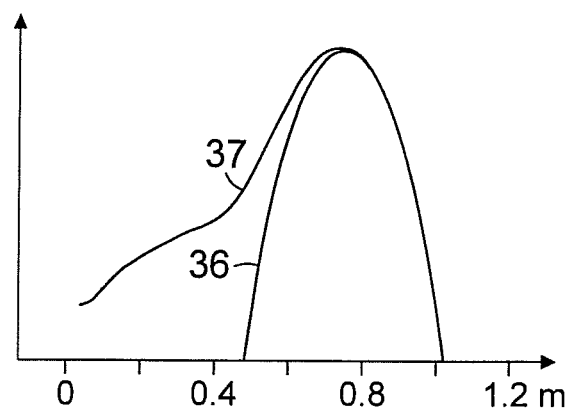
FIG. 6 is an exemplary graphical plot of the power spectrum of the echo profile obtained when the method in accordance with the invention and when it is not used.

FIG. 6 is a graphical plot of the power spectrum 36 of the echo profile obtained when using the method in accordance with the invention in comparison with the power spectrum 37 if the method in accordance with the invention is not used. Here, it can be clearly seen that the power spectrum 36 from which the front end interferences have been removed has a shape with a well-defined peak area for further detection. This is the key in improving accuracy.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A method implemented in a frequency modulated continuous wave ranging device which increases an ability of the frequency modulated continuous wave ranging device to accurately determine a distance between the frequency modulated continuous wave ranging device and a target, the method comprising:
  transmitting a transmit signal toward the target;
  receiving a receive signal caused by reflections of the transmit signal from the target;

determining a frequency difference signal of the transmit signal and the receive signal;

calculating a frequency-domain echo profile from the frequency difference signal;

storing a low-frequency portion of the echo profile as a temporary interference profile;

subtracting, if already available, a valid interference profile from the frequency-domain echo profile to increase an accuracy of a subsequent determined distance between the frequency modulated continuous wave ranging device and the target;

analyzing one of (i) the frequency-domain echo profile and (ii) an interference-free echo profile to determine the distance of the target; and returning to said transmitting the transmit signal if (i) the target is in close range to the ranging device and (ii) the valid interference profile is available; otherwise subtracting the temporary interference profile from the frequency-domain echo profile;

analyzing the echo profile minus the temporary interference profile for another determination of the distance of the target;

saving the temporary interference profile as the valid interference profile if a difference of a result of two determinations of the distance is within a specified tolerance; and returning to said transmitting the transmit signal if the valid interference profile is not yet available; otherwise updating the valid interference profile by using the temporary interference profile; and returning to said transmitting the transmit signal if (i) the target is not in close range to the ranging device and (ii) the valid interference profile is available;

otherwise saving the temporary interference profile as the valid interference profile; and returning to said transmitting the transmit signal if the valid interference profile is not yet available.

2. The method of claim 1, wherein said having the temporary interference profile as the valid interference profile if the target is not in a close range to the ranging device and the valid interference profile is not yet available is preceded by intermediate steps of:

subtracting the temporary interference profile from the echo profile;

analyzing the echo profile minus the temporary interference profile for another determination of the distance of the target; and returning to said transmitting the transmit signal if the difference of the result of the two determinations of the distance is outside the specified tolerance.

3. The method of claim 1, wherein the echo profile is calculated by Fast Fourier Transformation comprising an array of complex values corresponding to frequencies.

4. The method of claim 2, wherein the echo profile is calculated by Fast Fourier Transformation comprising an array of complex values corresponding to frequencies.

5. The method of claim 1, wherein said updating the valid interference profile by using the temporary interference profile comprises:

computing a weighted average of the valid interference profile and the temporary interference profile; and saving the result as the updated valid interference profile.

6. The method of claim 1, wherein analyzing the echo profile to determine the distance comprises:

calculating a power spectrum density of the echo profile to estimate a frequency of interest as a frequency corresponding to a largest component of the power spectrum density; and calculating the distance of the target from said frequency of interest.

7. The method of claim 1, wherein the method is implemented to perform a level measurement; wherein the target is a surface of a material one of (i) in a container and (ii) on a carrier.

8. The method of claim 1, wherein the method is implemented via a radar-based FMCW ranging device.

* * * * *